Patented May 30, 1933

1,912,330

UNITED STATES PATENT OFFICE

TRUMAN B. WAYNE, OF HOUSTON, TEXAS

PROCESS OF RESOLVING PETROLEUM EMULSIONS

No Drawing.    Application filed May 21, 1931. Serial No. 539,125.

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

The present process consists of subjecting a petroleum emulsion of the water and oil type to the action of small proportions of a complex organic condensation product of high molecular weight, resembling somewhat the synthetic resins produced by the condensation of two or more organic bodies containing resinophore groups selected from the well known group of compounds known to undergo such reactions, e. g. polyhydric alcohols, aldehydes, aldols, ketones, aromatic hydroxy bodies, unsaturated higher aliphatic acids, cyclic carboxylic acids, primary amines, amides, and their substituted derivatives.

The new resolving agents disclosed herein are prepared in such a manner that the condensation reactions are not permitted to proceed to the point where water and/or oil insoluble resins are produced. This may be accomplished in various ways, as for example, by retarding the condensation reactions by the presence of an interfering substance, usually a hydrophilic colloid and/or a solvent which increases its miscibility in water; or through the substitution of certain groups which prevent the formation of hard, insoluble resins, and increase the solubility in water and/or impart a marked hydrotropic effect to the finished product.

While the herein described series of complex condensation products resemble very closely a modified synthetic resin or "plasticizing agent", they are likewise similar in composition to the more complex dye-stuffs, and may be either acidic or basic, depending upon the nature and proportions of the various groups introduced, and may be soluble in either water or oil, depending again on the nature of the completed condensation product, and in certain instances may have a pronounced hydrotropic effect and thus possess many of the properties of a mutual solvent for water and oil.

My broad idea contemplates the use of a resolving agent having the general characteristics above described, prepared from various combination of organic groupings produced in various ways. I attribute the effectiveness of this new type of compound to its high colloidality, coupled with its very pronounced hydrotropic effect, resulting in a very marked action at the interfaces of a water-in-oil emulsion.

While an attempt will be made to define the course of the various chemical reactions involved in the preparation of these products, and approximately state their composition, it is to be understood, however, that the invention is not dependent on any theory herein expressed as to the course of the reactions or as to the composition of the products except as defined in the appended claims.

As stated above, a composition of the desired properties may be prepared by substituting certain groups in the complex organic condensation products prepared by the reaction of organic compounds containing resinophore groups. For example, the condensation product of synthetic resin type may be modified by the introduction of one or more organic groupings selected from the group comprising alkyl, cyclo-alkyl, aralkyl, sulfonic, and carboxyl groups. In some instances, the modifying agent may be a detergent body. Specifically, the modifying agent may be an acid selected from the group comprising organic soap-forming sulfonic carboxylic, and sulfo-carboxylic acids, or their salts, esters or amides. Further, modified fatty acids and residues from modified fatty acids may constitute modifying agents. Other specific compounds suitable for use are indicated below and it will be noted that in many instances the final complex condensation product employed as the resolving agent may contain several modifying groupings.

In addition to the features which characterize this new type of compound which are set forth above it is to be noted that many of the products are capable of undergoing saponification with alkalis. Moreover, many of the complex condensation products are very stable toward calcium and magnesium salts, and may be successfully used in relatively small proportions on petroleum emulsions which contain natural hard waters in a finely emulsified condition, and which do not readily respond to treatment with the usual commercial resolving compounds based on modified fatty acids, because of the formation of water-insoluble, oil-soluble calcium and magnesium soaps.

In order to specifically illustrate the new type of complex condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their substituted derivatives, and other proportions, may be employed without departing from the spirit of the invention or the scope of the appended claims. My broad idea contemplates the formation of condensation products similar to the well known synthetic resins and plastics formed by the condensation reactions between chemical bodies or groups of the character mentioned above, but differing from these insoluble resins in that they are highly colloidal and usually water-soluble as a result of the incorporation therein of organic residues by nuclear substitution and condensation reactions which form complex products of very high molecular weight possessing the desired colloidality and wetting properties.

Example 1

An aromatic amine, such as aniline oil, is first sulfonated and the resulting product reacted with a polyhydric alcohol. In the preferred practice of this embodiment of the invention, 300 parts of 98–100 per cent. sulfuric acid are run into a jacketed reaction kettle and 100 parts of aniline oil are cautiously added. The mixture, consisting of aniline sulfate with an excess of sulfuric acid, is heated to 180–200° C. by circulating heated oil or steam in the jacket, and maintained at this temperature until converted into water-soluble form. While still warm enough to prevent crystallization of the sulfonated material, the acid solution is slowly run into 200 parts of a polyhydric alcohol, preferably ethylene glycol or diethylene glycol while stirring constantly. A thick, viscous, soft resin is formed, the properties of which can be varied by the temperature at which the reaction occurs and the duration of the heating period. In preferred practice, the heating should be conducted at about 100° C. until a soft resin of maximum viscosity is obtained, which product is water-soluble.

Example 2

The sulfonated aniline is prepared and added to the polyhydric alcohol in the manner set forth in Example 1, after which from 10 to 50 parts of an aldehyde solution, such as a 40 per cent. formaldehyde solution, are added slowly while stirring constantly. A very viscous, soft resin is formed which is water-soluble. Care must be taken to avoid too prolonged heating and employing an excessive amount of formaldehyde since an insoluble resin may be formed in such cases.

Example 3

A water-soluble resin having marked emulsifying and wetting properties may be prepared by reacting an aldol with an amide derivative of carbonic acid at an elevated temperature. In preferred practice, a molecular portion of aldol prepared form acetaldehyde in the usual manner is allowed to react with a molecular proportion of urea at approximately from 110° to 120° C.

Example 4

A thick resin which may be sulfonated to render it water-soluble may be prepared by heating together at an elevated temperature a polyhydric alcohol, an aromatic dibasic acid or anhydride, and a higher unsaturated fatty acid. In preferred practice the product is prepared by heating molecular quantities of diethylene glycol, phthalic anhydride and oleic acid at approximately 200°–210° C. The thick resin produced is sulfonated preferably with an equal volume of chlorosulfonic acid or oleum at approximately 90°–140° C. to render it water-soluble.

Example 5

100 parts of anisole (phenyl methyl ether) are reacted with 50 parts of 40 per cent. formaldehyde solution to form a resin-like product which is cautiously treated with oleum at room temperature until water-soluble. The high molecular weight of the sulfonic acids so produced are active wetting agents, and of great value in the dehydration of petroleum emulsions.

Example 6

A molecular proportion of a higher unsaturated fatty acid, such as oleic or ricinoleic acid, is dissolved in a greater than molecular proportion of an alkyl ether derivative of a polyhydric alcohol, such as ethylene glycol monoethyl ether, and heated under a reflux condenser for about four hours. A molecular quantity of a phenol, phenoloid body, or other aromatic body capable of producing resinous or colloidal substances, such as ordinary phenol or cresylic acid, is dissolved in an excess of oleum and slowly added to the ether-alcohol ester of the fatty acid, and the mass heated until a sulfonated, water-soluble condensation product is obtained.

Some of the products prepared in accordance with the examples set forth above are very active demulsifying agents for water-in-oil emulsions, and may be used as such. However, more complex condensation products may be prepared in several ways, as indicated below, and are preferred as treating agents. In particular, I have found it advantageous to employ as resolving agents the products formed by condensing any of the products described in the foregoing examples with aromatic sulfonic acids or their nuclear-substituted derivatives.

When such products are to be employed, I prepare a separate batch of a nuclear-substituted aromatic sulfonic acid, such as an alkyl, aryl, aryl-alkyl, or cyclo-alkyl aromatic sulfonic acid, according to any of the well known methods of preparing such chemical bodies, and condense one part of the soluble resins described above with from 1 to 10 parts of the substituted aromatic acid, the proportions of reacting materials employed varying with the type of resin treated. As the unwashed derivatives are usually used in these condensing reactions, they are often sufficiently acidic to condense upon warming and agitating but, if desired, sufficient oleum or chlorosulfonic acid may be added to complete the condensation. While the acid mass resulting from the treatment may be employed it is also possible, and sometimes advantageous, to employ an ester, salt, or amide derivative.

The following example is illustrative of this embodiment of the invention:

*Example 7*

100 parts of a water-soluble resin as prepared according to Examples 1 or 2 are condensed with 500 parts of butylnaphthalene sulfonic acid, prepared as follows:

100 parts of 98 per cent. sulfuric acid are run into a jacketed reaction kettle and heated to a temperature of approximately 160° C. 500 parts of melted naphthalene are slowly run into the heated acid and the temperature is raised to approximately 180° C. and the mass maintained at such temperature for about two to three hours, or until the naphthalene has become intensively sulfonated, this possibly being brought about through the substitution of two or three sulfonic groups.

800 parts of 98 per cent. sulfuric acid are slowly run into a coil-equipped reaction vessel containing 500 parts of normal butyl alcohol, the temperature being maintained below 85° C. The acid butyl sulfate so formed is then added to the naphthalene sulfonic acid, which previously has been cooled to about 100°-125° C., over a period of two hours, and the heating is continued for an additional period of three hours, if necessary, to complete the alkylation.

500 parts of the resulting acid mass are then condensed at approximately 80° to 100° C. with 100 parts of the soft synthetic resin prepared according to Examples 1 or 2 to form a very complex condensation product of extremely high molecular weight which is unusually efficient as a treating reagent for petroleum emulsions.

The acid mass produced may be used as such or, as is sometimes found to be advantageous, it may be converted into its sodium, potassium, or ammonium salt, or into its ester by combination with alcohols.

*Example 8*

A complex condensation product such as that prepared in accordance with the preceding example may be further condensed with a suitable compound or grouping to provide a resulting water or oil soluble amide. For example, the acid condensation product may be condensed with secondary, tertiary, or quarternary aliphatic amines or substituted aromatic amines which yield water or oil soluble amides. In preferred practice I employ an alkyl amine, particularly one which contains one or more hydroxylated aliphatic groups, such as triethanolamine. Products of this type have been found to be unusually effective agents for resolving petroleum emulsions.

As a specific example of this embodiment of the invention, 500 parts of the acid condensation product prepared according to the method covered by Example 7, which may be freed from its excess of mineral acid by any well known method, are combined with 50 parts of triethanolamine.

*Example 9*

According to another embodiment of the invention an alkyl phenol is condensed with a ketone, the condensation preferably being effected in the presence of a mineral acid. The resulting product is added to strong sulfuric acid and heated until the mass thickens, whereupon the resulting mass is mixed with a fatty acid ester of a polyhydric alcohol and stirred to bring about sulfonation and condensation. The resulting mass is then washed with water to remove the free acid and may be used as such or may be converted into a water-soluble salt or into an amide or ester.

In the preferred practice of this embodiment of the invention, 100 parts of an alkyl phenol, such as m- or p-cresol, or a mixture of the two, are condensed with a molecular proportion of a ketone, such as acetone, by warming below 100° C. in the presence of a small quantity of mineral acid. The condensation may be effected in the presence of hydrochloric acid at a temperature of 30°-40° C.

by prolonged standing, or may be more quickly effected by heating the mass at 60°–70° C. for about four hours. The initial condensation product so formed is then slowly added to an equal volume of 98 per cent. sulfuric acid or oleum and heated at about 100° C. until the mass thickens appreciably. It is then slowly run into 200 parts of a fatty acid ester of a polyhydric alcohol, such as olein, castor oil, or linseed oil, and stirred to sulfonate and condense. The acid mass is then preferably washed with an equal volume of water to remove free mineral acid. The complex water-soluble condensation product so obtained may be used in the dehydration of petroleum emulsions in the form of the acid mass, or may be converted into the corresponding ammonium, sodium, or potassium salt, or into an amide or ester by combining it with a water-soluble amine or alcohol, respectively.

An alternative procedure would be to combine an alkylphenol, an aldehyde or ketone, and a polyhydric alcohol to form the initial condensation product which, after sulfonation as described above, is condensed with an aliphatic fatty acid containing more than 8 carbon atoms, and washed to remove free mineral acid.

Example 10

100 parts of the acid condensation product prepared according to Example 9 are condensed with from 100 to 500 parts of b-naphthalene sulfonic acid or a nuclear-substituted aromatic sulfonic acid such as that prepared in Example 7, by warming at 80°–100° C. The mass is diluted with water until an upper layer separates, which is drawn off and used as a demulsifier in the acid state or converted into its ammonium, sodium, or potassium salt, or into an ester by esterification with an alcohol, or into an amide by condensation with an organic base such as dimethylaniline, diethylaniline, triethanolamine, or the like. The demulsifiers of this type are highly colloidal in water solution, mix readily with oil, and are unusually effective agents for the resolving of petroleum emulsions.

Example 11

A compound containing the dibenzyl group and an aromatic sulfonic acid or a nuclear-substituted derivative thereof are condensed by warming in the presence of a small amount of oleum or chloro sulfonic acid. In preferred practice, 212 parts of benzoin (phenylbenzolcarbinol) and 226 parts of b-naphthalene sulfonic acid (or its equivalent such as a nuclear-substituted naphthalene sulfonic acid such as that prepared in Example 7) are condensed by warming in the presence of a small amount of oleum or chlorosulfonic acid. The resulting condensation product may be used as an acid mass or in the form of its salt, ester, or amide.

Example 12

A water-soluble condensation product, such as that prepared in Examples 1, 2, 3, 7 or 10, is cautiously treated with sulfur monochloride to effect polymerization into a compound of extremely high molecular weight which is still water-soluble. Caution must be observed to prevent the condensation from proceeding to the point where rubbery or insoluble products are obtained, as none of these should appear in the final product. The product is preferably used in the form of its sodium, potassium or ammonium salt. Products of this type are highly efficient in the dehydration of petroleum emulsions and I attribute this high efficiency to the high molecular weight and colloidality of the products.

It is obvious that many permutations and combinations of substances may be prepared from the various reactive bodies known to undergo resinification, and that only a few examples can be given in the specification. It is also obvious that two or more of the resins produced may be further condensed and then combined with a nuclear-substituted aromatic sulfonic acid, and that alkylation and sulfonation can often be conducted simultaneously with resinification in many cases.

Proportions of reacting substances, temperatures, time of heating, etc., are specified in some of the preceding examples while more general directions only are given in others. Obviously, many permutations and combinations in proportions of reacting bodies are made possible by varying the time of heating and/or the temperatures used. For example, if molecular proportions of a polyhydric alcohol and an aldehyde, or an aromatic sulfonic body and an aldehyde, are heated at a certain temperature for $n$ minutes to form a water-soluble condensation product, it is obvious that if only one-half mole of aldehyde is used, the heating must be extended or the temperature raised, or both, to obtain a condensation product of the same characteristics. Conversely, if two moles of aldehyde are used either the temperature must be reduced or the time of heating shortened, or both, to prevent the condensation from proceeding to the point where insoluble resins are obtained. The properties of the particular aldehydes, alcohols, etc., used will likewise influence the procedure employed in the preparation of these soluble resinous bodies as will also the nature of the organic residues present in substituted derivatives of the various phenols, aldehydes, amines, etc. These various considerations, however, are within the knowledge and practices of the trained organic chemist and will be readily understood by those skilled in the art.

Where reference is made in the appended claims to "carboxyl and sulfonic groups" it is to be understood that this refers to the presence of COOH and $SO_2.OH$ groups respectively, and also to the products formed when they are neutralized by a metallic base, ammonia, or organic amine. Equivalents of these groups are also contemplated.

The term "water-soluble" is used to include the property of forming colloidally hydrated aqueous solution.

The term "hydrotropic" as employed herein is used in its physico-chemical sense, i. e. as applying to materials which have the property of transforming certain substances normally insoluble in water into clear, watery solutions.

The improved treating agents prepared in accordance with the present invention are used in the proportion of one part of treating agent to from 2,000 to 20,000 parts of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I do not make any claim to the simpler condensation products of the substituted sulfonic acids such as those produced by treating the latter with aldehydes, polyhydric alcohols, and fatty acids, such as those claimed by other inventors, as many of these involve only the linking of two cyclic or polycyclic groups by means of an aldehyde bridge or a similar condensation reaction.

I claim:—

1. The process of resolving water-in-oil emulsions which comprises adding thereto a complex water-soluble condensation product resulting from the interaction of organic bodies containing resinophore groups, said condensation product being selected from the group consisting of: water-soluble condensation products of an aldol and an amide derivative of carbonic acid; water-soluble sulfonated condensation products of anisole and formaldehyde; water-soluble sulfonated condensation products of a polyhydric alcohol, an unsaturated fatty acid, and a dicarboxylic compound selected from the group comprising aromatic dibasic acids and anhydrides thereof; and water-soluble condensation products of a body containing the dibenzyl group with an aromatic compound selected from the group comprising aromatic sulfonic acids and nuclear-substituted derivatives of aromatic sulfonic acids.

2. The process of resolving water-in-oil emulsions which comprises adding thereto a treating agent of the modified synthetic resin type comprising a water-soluble condensation product of an aldol and an amide derivative of carbonic acid.

3. The process of resolving water-in-oil emulsions which comprises adding thereto a treating agent of the modified synthetic resin type comprising a water-soluble condensation product of an aldol and urea.

4. The process of resolving water-in-oil emulsions which comprises adding thereto a treating agent of the modified synthetic resin type comprising a water-soluble aldol-urea resin condensed with an aromatic compound selected from the group comprising aromatic sulfonic acids and nuclear-substituted derivatives thereof.

5. The process of resolving water-in-oil emulsions which comprises adding thereto a treating agent of the modified synthetic resin type comprising a soluble derivative of an aldol-urea resin condensed with an aromatic compound selected from the group comprising aromatic sulfonic acids and nuclear-substituted derivatives thereof, said soluble derivative being a salt, ester, or amide thereof.

6. The process of resolving water-in-oil emulsions which comprises adding thereto a treating agent of the modified synthetic resin type comprising a water-soluble sulfonated condensation product of anisole and formaldehyde.

7. The process of resolving water-in-oil emulsions which comprises adding thereto a treating agent of the modified synthetic resin type comprising a water-soluble sulfonated condensation product of anisole and formaldehyde, and an aromatic compound selected from the group comprising aromatic sulfonic acids and nuclear-substituted derivatives thereof.

8. The process of resolving water-in-oil emulsions which comprises adding thereto a treating agent of the modified synthetic resin type comprising a soluble sulfonated condensation product of anisole and formaldehyde, and a water-soluble salt, ester, or amide derivative of an aromatic sulfonic acid.

9. The process of resolving water-in-oil emulsions which comprises adding thereto a treating agent of the modified synthetic resin type comprising a water-soluble sulfonated condensation product of a polyhydric alcohol, an unsaturated fatty acid, and a dicarboxylic compound selected from the group comprising aromatic dibasic acids and anhydrides thereof.

10. The process of resolving water-in-oil emulsions which comprises adding thereto a treating agent of the modified synthetic resin type comprising a water-soluble sulfonated condensation product of a polyhydric alcohol, oleic acid, and phthalic anhydride.

In testimony whereof I affix my signature.

TRUMAN B. WAYNE.